Patented May 16, 1933

1,909,177

UNITED STATES PATENT OFFICE

IRVING C. HONEGGER, OF HOUSTON, TEXAS, ASSIGNOR TO ALUMINUM COMPANY OF AMERICA, OF PITTSBURGH, PENNSYLVANIA, A CORPORATION OF PENNSYLVANIA

METHOD OF PROTECTING CONCRETE WHILE SETTING

No Drawing. Application filed August 1, 1930, Serial No. 472,501. Renewed August 13, 1932.

This invention relates to methods of protecting concrete during that period in which the freshly laid material is hardening and setting.

The basis of substantially all concrete is the union of inert materials by substances produced through chemical reaction between Portland cement and water. The setting and hardening of Portland cement is principally caused by the hydration, in the order named, of the three major cement constituents, $3CaO.Al_2O_3$, $3CaO.SiO_2$, and $$2CaO.SiO_2.$$

Any acceleration or retardation of this chemical process affects the quantity and quality of the binder resultant from this hydration, and thus affects critically the quality, strength, and endurance of concrete formed by admixture of the binding product with sand, stone, or similar aggregate.

The object of the invention is to provide an improved method of controlling and regulating the process of hydration and other chemical processes which take place in concrete while setting and hardening through the provision of a coating which is easily and cheaply applied and has other material advantages, as will hereinafter be explained.

The invention is predicated on the use of thin metallic sheets as protective coverings for concrete during the period of its setting and hardening, and on my discovery that when so used such metallic coatings are superior to known coverings in the proper control of the reactions taking place in the concrete during its hardening period.

An important consideration in the proper handling of concrete is the maintenance in the mixture, during the period of hardening and setting, of sufficient water to produce complete hydration. To insure the proper water content, it has been the practice to cover freshly laid concrete with burlap, canvas, straw, earth, saw-dust, or the like, in endeavors to prevent evaporation of water from concrete when exposed to the wind or to the rays of the sun. In using such coverings, it has also been the practice to moisten them at intervals. These ways of covering concrete have certain inherent disadvantages. They are crude in their application, they require the transportation and application of bulky substances and the constant wetting or moistening of the covering materials to maintain the proper moisture content in the upper layers of the concrete, and, furthermore, when the concrete has finally set and hardened, it is necessary to remove the protective coatings, often at some expense.

I have found that the use of a thin metallic coating, such as metallic foil, overcomes many of the disadvantages of the heretofore known coverings, and has concomitant advantages. The metal used as a coating may be one of the several metals readily obtained in the form of foil or sheet, but generally I have preferred, for reasons which will presently appear, to use aluminum foil. The metallic foil or sheet, which is usually obtained in coiled form, is placed upon the concrete immediately after it is laid. Being substantially non-porous and completely covering the surface of the concrete, the metal prevents any substantial escape of the water originally contained in the concrete, and thus insures that the concrete, while setting and hardening, retains the water necessary to the essential hydration of the constituents of the cement, regardless of the climatic conditions and without the further application of water.

When applied to concrete in accordance with my invention, these thin metallic coatings are extremely useful regardless of the particular condition or consistency of the concrete. They are especially useful, however, when the concrete has been laid in a "dry" condition, which is often done for the purpose of obtaining concrete masses having very high strengths. In such cases, it is highly desirable that no substantial amount of water be lost from the mixture during the setting and hardening operation, lest the amount of water remaining in the concrete be insufficient to develop proper hydration. Under these conditions, my use of thin metallic coverings is very beneficial in insuring that substantially all of the water placed in the mixed concrete will be present during the hydrating period.

Since the speed of the chemical reactions taking place in the concrete during the setting and hardening period exerts an important influence on the strength of the material, it is important under certain climatic conditions to protect setting and hardening concrete from the direct heating action of the sun's rays, lest the reaction, under the influence of excessive temperatures, attains a speed injurious to the final concrete structure. The use of a metallic foil covering, such as aluminum foil, which may be prepared with a bright reflecting surface, has an appreciable effect in offsetting the radiant and other heating effect of the rays of the sun, and accordingly in maintaining the concrete at a temperature conducive to proper hydration of the cementing material.

This may be accomplished by placing metal foil on the concrete with its bright metallic surface upwards so that the sun's rays are not absorbed, as in the case of the prior coverings, but are reflected with the result that the underlying concrete is not subjected to a severe heating.

An important advantage of the use of such metallic coverings is that they offer a substantial protection against the action of rain, hail, and snow which, coming in contact with the freshly laid concrete, often injure the concrete, as by washing away or floating the top layer of cement out of the mixture. The metal foil is impervious to water, and serves to immediately deflect water which would otherwise injure the surface of the concrete.

In applying a thin metal coating or foil to concrete, I have found that it is usually unnecessary to provide any means for holding it in position, because the moisture in the concrete effects such an adherence of the foil to the concrete as is sufficient under ordinary conditions to hold it in place. Moreover, the chemical reactions resulting when the corrosive substances present in concrete attack the metal also serve to firmly hold or bind the thin metallic coating to the concrete surface unless and until a substantial portion of the metal surface adjacent the concrete is corroded.

My improved method of protecting concrete is particularly advantageous when the surface of the concrete is slanting or vertical. According to prior methods of caring for concrete surfaces during early setting stages, it was often necessary to supply water to its surface to replace the moisture removed by the action of the sun and the wind. This could not be done effectively when the surface of the concrete was slanting or vertical because the surface of the freshly laid concrete would be washed downwardly by the action of the water. Moreover, in the case of rain, a slanting or vertical concrete surface which is not suitable protected is washed away to a greater extent than a horizontal surface. In such cases, the applying of a thin metal coating to a slanting or vertical concrete surface is particularly advantageous in that it eliminates the necessity of supplying water to such surface, and also prevents rain from injuring and washing away a fresh surface.

In practicing my invention, any suitable thin metallic coating may be used, particularly where a bright metallic surface is not essential. I have found, however, that aluminum foil is best suited to the covering of concrete because of its availability, low cost, and the fact that in coiled form it may be easily transported because of its light weight. When using aluminum foil in the covering of concrete, it has been found that the action of the caustic substances contained in the Portland cement reacts with the metal, and in the course of time corrodes it to some extent. This, however, is not a disadvantage because under normal conditions the foil is not destroyed by this corrosive action until it has remained on the concrete sufficiently long to accomplish its intended purpose. Moreover, as the action of the corroding substances on aluminum foil increases, the foil becomes porous, and finally, when thin material is used, it becomes detached from the concrete and blown away by the wind, or, when the coated concrete structure is a highway, may be worn away by the action of traffic. In any case, it is unnecessary, as with the use of prior coatings, to remove the coating material, which advantage results in a considerable saving in cost of construction.

The thickness of the metallic foil applied as a coating material is, with the following limitations, comparatively unimportant. To reduce cost it is desirable, of course, that no more metal be used than necessary, and it is also desirable to use a metal of such thinness that it is relatively pliable, and that when placed upon concrete it adapts itself to the imperfections in its surface and adheres to substantially the entire surface area. In practicing my invention with the use of aluminum foil, I have used material of a thickness of 0.0003 to 0.0007 inch in thickness. Thicker or thinner material may be used, these representing limits of convenience rather than of usefulness. Under some conditions, it may be desirable to reuse the coating material. In such cases, a thicker foil should be used so that the corrosive action will not be so great as to preclude removal and further use, or, which is preferred, the aluminum foil may be coated on one side with a very thin coating of asphaltic or bituminous material. This coating serves to resist chemical reaction of the concrete, and thus preserves the foil for further use, or so preserves the foil that it may be left upon the concrete as a more or less permanent coating if desired.

Instead of using one layer of foil, two very thin layers may be used cemented together with a cement having an asphalt or bituminous base so that, when the chemical action tends to destroy the layer adjacent to the concrete surface, it is arrested by the cementing substance, and the top layer preserved intact indefinitely if it is desired to cover the concrete for a long period. Furthermore, in the practice of my invention use may be made of a laminated covering structure of foil joined together with a cement and built up to any desired width and strength. If it is not desired to coat the metallic foil with a thin asphaltic or bituminous material, a good resistance to corrosion can be obtained by the use of a foil coated on one side with paper. In such case, when the paper-coated surface is applied to concrete, the absorption of moisture by the paper accomplishes the desired adhesion to the concrete, and the resistance of the paper to chemical action protects the foil to a substantial extent. A paper-backed foil coating has certain other advantages in that a stronger product may be built up with the use of a thinner foil, thus effecting the same result as in the case of uncoated foil coverings, but with the use of less metal and, therefore, at less cost.

In the practice of my invention, thin metallic coatings may be applied to concrete in any convenient manner. For ease in application it is desirable to obtain the metal in the form of rolls, which may be unrolled evenly over the surface of the freshly laid concrete. While it is not necessary, it is often found desirable, after placing the metal upon the concrete, to pass over the surface of the metal a light roller which serves to firmly press the metal onto the surface of the concrete and cause it to adhere to any configuration or contour of it.

According to the provisions of the Patent Statutes, I have explained the principle of my invention and its mode of operation, and have given specific examples of how it may be practiced. However, I desire to have it understood that, within the scope of the appended claims, the invention may be practiced otherwise than as specifically described.

I claim as my invention:

1. The method of protecting concrete surfaces during the hardening and setting of the concrete, comprising applying to the concrete surface a thin metallic layer capable of conforming to and adhering to such surface.

2. The method of protecting concrete surfaces during the hardening and setting of the concrete, comprising applying to the concrete surface a thin layer of aluminum capable of conforming to and adhering to such surface.

3. The method of protecting concrete surfaces during the hardening and setting of the concrete, which comprises applying to the surface of the concrete a multiple joined layer of thin metallic material.

4. The method of protecting concrete surfaces during the hardening and setting of the concrete, which comprises applying to the surface of the concrete a multiple layer of adhesively bound metallic sheets.

5. The method of protecting concrete surfaces during hardening and setting of the concrete, comprising applying to the concrete surface metallic foil coated with a corrosion-protecting material, the coated surface of the foil being placed in contact with the concrete surface.

6. The method of protecting concrete surfaces during hardening and setting of the concrete, comprising applying to the concrete surface a metallic foil having an exposed bright surface.

In testimony whereof, I sign my name.

IRVING C. HONEGGER.